(12) United States Patent
Han et al.

(10) Patent No.: US 12,440,056 B2
(45) Date of Patent: *Oct. 14, 2025

(54) ELECTRIC PRESSURE COOKER

(71) Applicant: IB APPLIANCES US HOLDINGS LLC, Downers Grove, IL (US)

(72) Inventors: Yude Han, Zhejiang (CN); Jiwei Wang, Kanata (CA); Yi Qin, Kanata (CA)

(73) Assignee: IB APPLIANCES US HOLDINGS, LLC, Chicago, IL (US)

( * ) Notice: Subject to any disclaimer, the term of this patent is extended or adjusted under 35 U.S.C. 154(b) by 315 days.

This patent is subject to a terminal disclaimer.

(21) Appl. No.: 17/988,543

(22) Filed: Nov. 16, 2022

(65) Prior Publication Data
US 2023/0070803 A1 Mar. 9, 2023

Related U.S. Application Data

(63) Continuation of application No. 15/930,843, filed on May 13, 2020, now Pat. No. 11,529,012.

(30) Foreign Application Priority Data

May 13, 2019 (CN) .......................... 201910393997.4

(51) Int. Cl.
*A47J 27/09* (2006.01)
*A47J 27/00* (2006.01)

(52) U.S. Cl.
CPC ............. *A47J 27/09* (2013.01); *A47J 27/004* (2013.01)

(58) Field of Classification Search
CPC ................................ A47J 27/09; A47J 27/004

USPC ........................................................... 99/324
See application file for complete search history.

(56) References Cited

FOREIGN PATENT DOCUMENTS

| CN | 1126428 | 7/1996 |
|----|---------|--------|
| CN | 202154510 | 3/2012 |
| CN | 202198404 | 5/2012 |
| CN | 202761003 | 3/2013 |
| CN | 103169401 | 6/2013 |
| CN | 203153443 | 8/2013 |

(Continued)

OTHER PUBLICATIONS

CN206183012 (Year: 2024).*

(Continued)

*Primary Examiner* — Thien S Tran
(74) *Attorney, Agent, or Firm* — Crowell & Moring LLP

(57) ABSTRACT

An electric pressure cooker comprises a body having outer pot and inner pot received therein and a lid covering the cooker body. The outer pot and the lid comprise matching teeth for lockingly engagement upon rotating the lid into closure. The cooker body comprises a pair of cooker handles extending outwardly from a sidewall thereof. The cooker handle comprises handgrip portion. The inner pot comprises inner pot body and a pair of inner pot handles connected thereto. The handgrip portion extends to align with or beyond the inner pot handle, so that a user holding the cooker handles will avoid gripping the inner pot handles. A vertical gap between the inner pot handle and the handgrip portion allows hand access. When the user is reaching for the inner pot handle the fingers will contact the cooker handle, thereby avoiding mistakenly gripping the cooker handle.

14 Claims, 6 Drawing Sheets

(56) References Cited

FOREIGN PATENT DOCUMENTS

| | | |
|---|---|---|
| CN | 203290703 | 11/2013 |
| CN | 2034963400 | 3/2014 |
| CN | 203647077 | 6/2014 |
| CN | 204260545 | 4/2015 |
| CN | 204260546 | 4/2015 |
| CN | 204260547 | 4/2015 |
| CN | 204260548 | 4/2015 |
| CN | 20447611 | 7/2015 |
| CN | 204520275 | 8/2015 |
| CN | 204765114 | 11/2015 |
| CN | 105167592 | 12/2015 |
| CN | 204862626 | 12/2015 |
| CN | 105266600 | 1/2016 |
| CN | 205083263 | 3/2016 |
| CN | 20567796 | 6/2016 |
| CN | 20567825 | 6/2016 |
| CN | 20567826 | 6/2016 |
| CN | 205267825 * | 6/2016 |
| CN | 205267826 * | 6/2016 |
| CN | 205285941 | 6/2016 |
| CN | 205322076 | 6/2016 |
| CN | 205338619 | 6/2016 |
| CN | 205649384 | 10/2016 |
| CN | 205697155 | 11/2016 |
| CN | 205758306 | 12/2016 |
| CN | 206183012 * | 5/2017 |
| CN | 206183012 U | 5/2017 |
| CN | 106108627 | 11/2018 |
| CN | 106108631 | 11/2018 |
| CN | 208709331 U | 4/2019 |

OTHER PUBLICATIONS

CN205267826 (Year: 2024).*
CN205267825 (Year: 2024).*
Search Report for Chinese Patent Application No. 2019103939974 dated Jan. 26, 2021, 1 pg.
Office Action with English Translation for Chinese Patent Application No. 201910393997.4 dated Feb. 2, 2021, 9 pages.
Office Action with English Translation for Chinese Patent Application No. 201910393997.4 dated May 26, 2021, 11 pages.

* cited by examiner

ELECTRIC PRESSURE COOKER

RELATED APPLICATIONS

This application is a continuation of U.S. Non-Provisional patent application Ser. No. 15/930,843, filed on May 13, 2020, pending, which claims priority to Chinese Patent Application 201910393997.4, filed on May 13, 2019, the entireties of which are incorporated herein by reference.

TECHNICAL FIELD OF THE INVENTION

The present invention relates generally to the field of small kitchen appliances, and more particularly to an electric pressure cooker.

BACKGROUND OF THE INVENTION

Electric pressure cookers are commonly found household appliances. Currently, the inner pot of an electric pressure cooker has a periphery rim. A user will have to hold this periphery rim by hand in order to retrieve the inner pot from the electric pressure cooker. However, the periphery rim is difficult to hand-hold, and as such it can be cumbersome or inconvenient for the users to retrieve the inner pot.

SUMMARY OF THE INVENTION

The present invention provides an electric pressure cooker enabling and allowing easy and convenient retrieval of the inner pot thereof.

In accordance with one aspect of the present disclosure, there is provided an electric pressure cooker, comprising: a cooker body comprising an outer pot, an inner pot removably receivable within the outer pot, and a lid assembly for covering the cooker body; wherein the outer pot comprises a plurality of cooker teeth, the lid assembly comprises a plurality of lid teeth corresponding with the cooker teeth, the cooker teeth and the lid teeth are constructed and arranged to lockingly engage with each other upon a rotation of the lid assembly into a closed position relative to the cooker body; wherein the cooker body comprises a pair of cooker handles extending outwardly from a sidewall of the cooker body, the cooker handle comprises a handgrip portion for lifting or moving the cooker body; wherein the inner pot comprises an inner pot body and a pair of inner pot handles connected to the inner pot body; wherein the handgrip portion extends from the cooker body to at least substantially align with the inner pot handle or beyond the inner pot handle, so that a user holding the cooker handles will avoid mistakenly handling or gripping the inner pot handles; wherein the inner pot handle is spaced apart from the handgrip portion in a vertical direction so as to define a gap between the inner pot handle and the handgrip portion for allowing fingers of a user to be received therein, such that when the user is reaching for the inner pot handle, the fingers will inevitably contact the cooker handle or a part thereof, thereby providing the user a confirmation or assurance of correct handling without mistakenly gripping the cooker handle.

In accordance with some embodiments of the present disclosure, the vertical gap between the inner pot handle and the handgrip portion has a width of about 10 mm to about 13 mm.

In accordance with some embodiments of the present disclosure, the handgrip portion comprises a slope portion for ease of handing by hand, wherein a gap between a distal end of the slope portion and the inner pot handle is about 11.5 mm to about 12.5 mm, and wherein a gap between a proximal end of the slope portion and the inner pot handle is about 10.5 mm to about 11.5 mm.

In accordance with some embodiments of the present disclosure, the handgrip portion is substantially flat in shape, and the gap between the inner pot handle and the handgrip portion has a width that is slightly narrower than an average thickness of an adult finger.

In accordance with some embodiments of the present disclosure, the cooker handle comprises a pair of sidewalls extending upwardly from opposing sides of the handgrip portion, respectively, wherein the handgrip portion and the pair of sidewalls enclose or form a receiving groove, and wherein the inner pot handle is constructed and arranged to be received or fitted within the receiving groove.

In accordance with some embodiments of the present disclosure, the inner pot handle comprises a connecting member fastened to the inner pot body, and a heat insulation member coupled to the connecting member, the heat insulation member is assembled to or integrally formed with the connecting member, wherein the outer pot comprises a cavity for receiving the inner pot therein, and a recess portion in communication with the cavity, wherein the connecting member is constructed and arranged to extend through the recess portion, and wherein the heat insulation member is disposed outside of the outer pot.

In accordance with some embodiments of the present disclosure, the cooker body comprises a base, an outer shell mounted to the base, and a middle board covering at least a portion of the outer shell, wherein the outer pot is mounted to the base, the outer shell and the middle board, and wherein the cooker handles are disposed on the middle board.

In accordance with some embodiments of the present disclosure, the heat insulation member comprises an upwardly concaved recess portion disposed on a bottom wall of the heat insulation member, the recess portion having such a tapering shape that a center portion of the recess portion has a larger depth relative to the bottom wall of the heat insulation member than a peripheral portion of the recess portion, wherein the tapering shape is formed to be substantially similar to a shape of a fingertip so as to allow easy access by hand.

In accordance with some embodiments of the present disclosure, the connecting member comprises a first attachment portion for snugly attaching to the inner pot body, a connecting portion substantially laterally or horizontally extending from the first attachment portion, and a second attachment portion extending from the connecting portion; wherein the connecting portion comprises an upper portion disposed in proximity to the inner pot body and a lower portion disposed in proximity to the heat insulation member; wherein the upper portion is constructed and arranged to provide clearance room for the outer pot or accommodate the structure thereof, and the lower portion is constructed and arranged to provide clearance room for the lid assembly or accommodate the structure thereof.

In accordance with some embodiments of the present disclosure, the first attachment portion is substantially arc-shaped so as to be in better conformity with the inner pot body.

In accordance with some embodiments of the present disclosure, the second attachment portion is constructed and arranged to bendingly extend from the connecting portion in an upward direction so that the heat insulation member is disposed at an elevated position, thereby allowing the receiving groove of the cooker handle to be constructed with a relatively shallower depth.

An electric pressure cooker in accordance with example embodiments of the present disclosure comprises an inner pot having inner pot handles disposed thereon thereby enabling and allowing easy and convenient retrieval of the inner pot from the electric pressure cooker.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
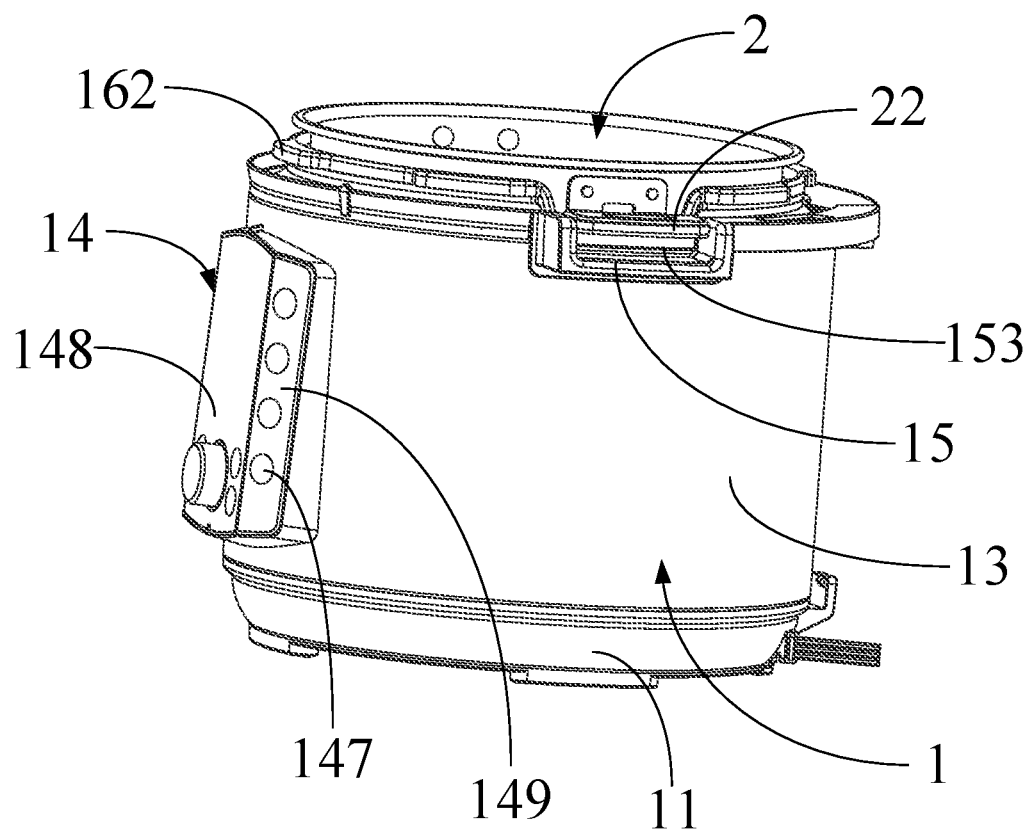
FIG. 1 is a perspective view illustrating an electric pressure cooker in accordance with an example embodiment of the present disclosure, without showing lid assembly.
Figure 2:
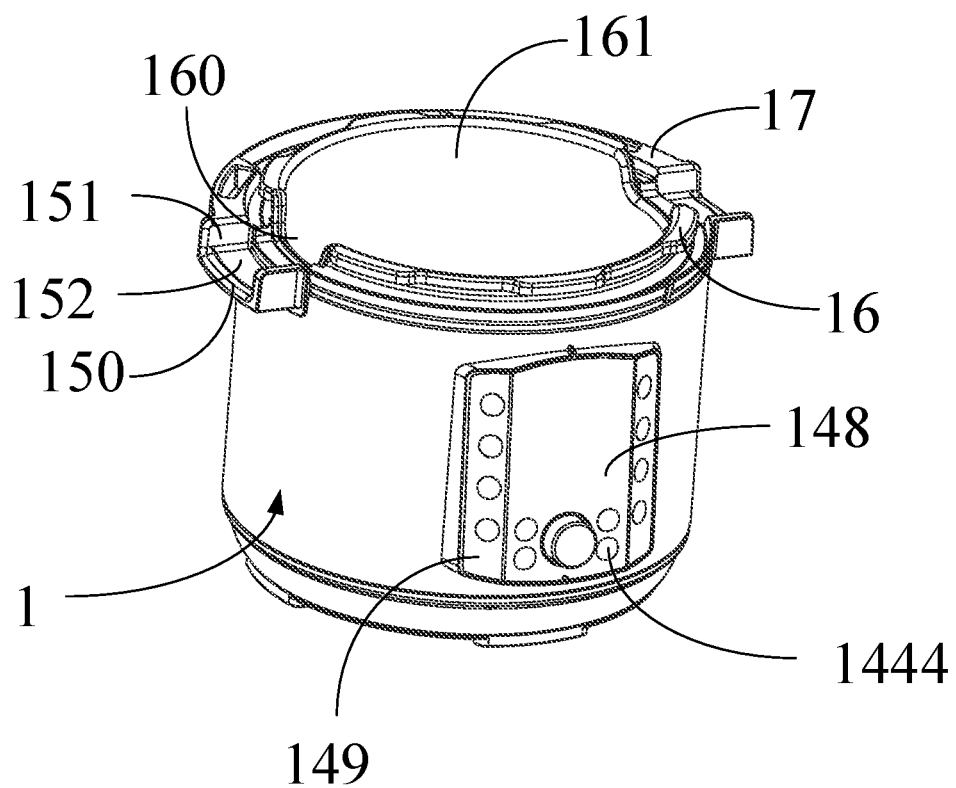
FIG. 2 is a perspective view of a cooker body of the electric pressure cooker of FIG. 1.
Figure 3:
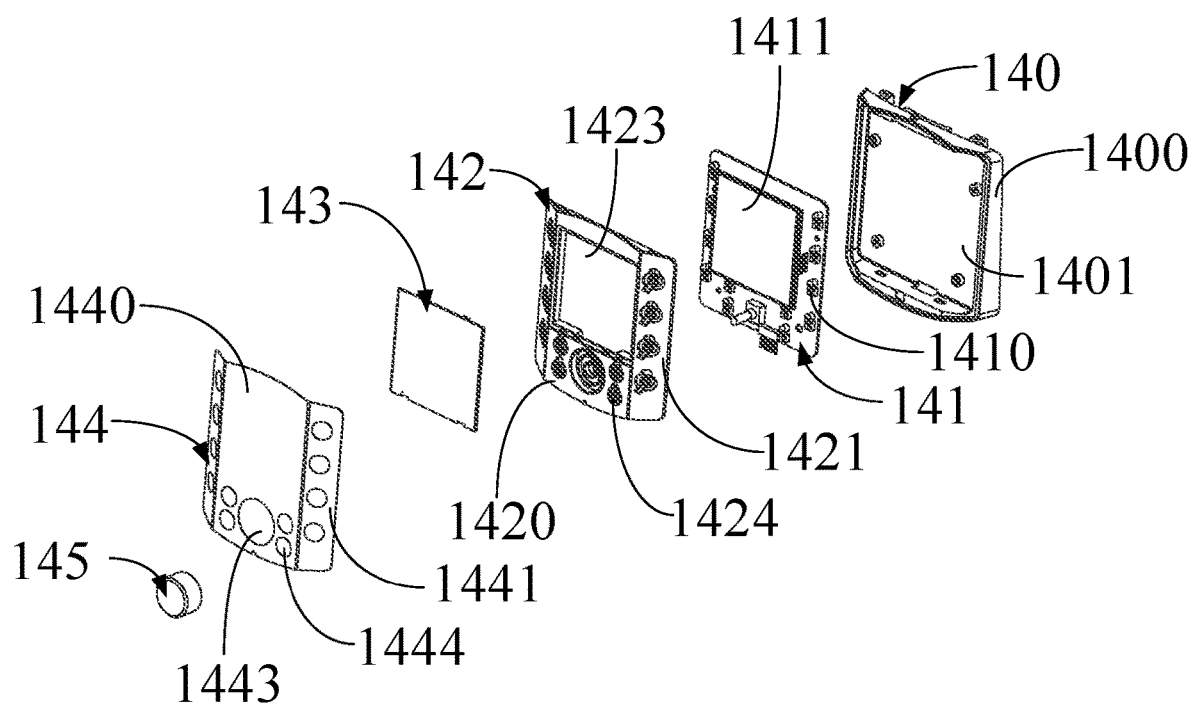
FIG. 3 is an exploded view of an operation panel of the electric pressure cooker of FIG. 1.
Figure 4:
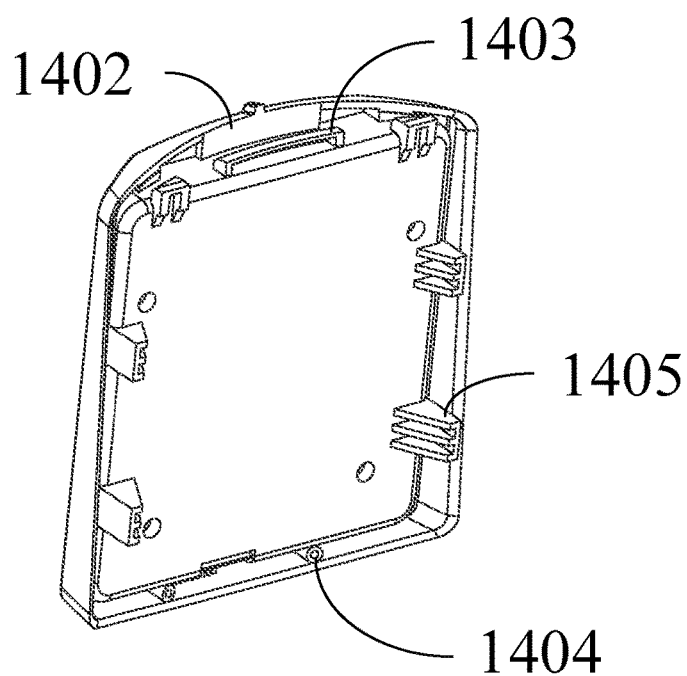
FIG. 4 is a perspective view of the operation panel of FIG. 3.

Exemplary embodiments will be described in detail herein, examples of which are illustrated in the accompanying drawings. When the following description refers to the accompanying drawings, unless otherwise indicated, the same numbers in different drawings represent the same or similar elements. The embodiments described in the following exemplary embodiments do not represent all embodiments consistent with the present invention. Instead, they are merely examples of devices consistent with some aspects of the present disclosure as detailed in the appended claims.

The terms used in the present application are for the purpose of describing particular embodiments only, and are not intended to limit the present application. Unless otherwise defined, technical terms or scientific terms used herein should have the ordinary meanings as understood by those having ordinary skilled in the art to which the invention pertains. The words "first", "second" and similar terms used in the specification and claims of the present application do not denote any order, quantity, or importance, but are merely used to distinguish different components. Similarly, the words "a" or "an" and the like do not denote a quantity limitation, but mean that there is at least one. "Multiple" or "several" means two or more. Unless otherwise indicated, the terms "front", "rear", "lower" and/or "upper" and the like are used for convenience of description and are not limited to one location or one spatial orientation. "Including" or "comprising" and similar words mean that the elements or objects that appear before "including" or "comprising" encompass the elements or objects listed after "including" or "comprising" and their equivalents, and do not exclude other elements or objects. The words "connection" or "connected" and the like are not limited to physical or mechanical connections, but may include electrical connections, whether direct or indirect. As used herein and in the appended claims, the singular forms "a", "said", and "the" are intended to include the plural forms unless the context clearly dictates otherwise. It should also be understood that, as used herein, the term "and/or" refers to and includes any or all possible combinations of one or more of the associated listed items.

Referring to FIGS. 1-4 and FIG. 9, an electric pressure cooker according to an example embodiment of the present disclosure comprises a cooker body, an inner pot removably receivable within the cooker body, and a lid assembly for covering the cooker body. In some embodiments, the cooker body comprises a base, a substantially cylindrical or arc-shaped outer shell mounted to the base, a middle board covering at least a part of a top portion of the outer shell, an outer pot mounted to the base, the outer shell and the middle board, an inner pot receivable within the outer pot, and an operation panel secured to the outer shell. The outer pot comprises one or more cooker teeth, whereas the lid assembly comprises one or more lid teeth (not shown). When the lid assembly is covering the cooker body, the lid assembly is operable to be rotated to a closed position wherein the cooker teeth and the corresponding lid teeth are lockingly engaged in a vertical direction such that the lid assembly cannot be lifted from the cooker body. In some embodiments, the outer shell is made of metals or metallic materials.

In some embodiments, the operation panel comprises a substantially flat display panel and a control panel coupled to at least one side of the display panel and inclinedly disposed or oriented relative to the display panel; wherein the control panel is inclinedly disposed or oriented such that an overall shape of the operation panel at least partially approximates that of the cylindrical or arc-shaped shell; and wherein the control panel comprises at least one control key disposed thereon for conveniently operating the electric pressure cooker. Advantageously, such a design provides an increased area of the display panel, thereby providing a bigger displaying area without substantially enlarging the dimensions of the operation panel.

In some embodiments, the operation panel comprises a rear installation panel secured to the outer shell, an electric circuit board secured to the rear installation panel, a button panel disposed to cover the electric circuit board, a transparent protective board secured to the button panel, a decorative film covering the button panel, and a rotary knob assembled to the button panel and extending through the decorative film.

In some embodiments, the rear installation panel comprises a panel portion comprising a receptacle disposed thereon, a first position-limiting member extending from the panel portion, a second position-limiting member extending from the panel portion, at least one fixing post, and a plurality of positioning protrusions. The electric circuit board and the button panel are disposed within the receptacle. The first position-limiting member and the second position-limiting member are disposed at an upper portion of the rear installation panel, the at least one fixing post is disposed at a lower portion of the rear installation panel, and one or more positioning protrusions are disposed on a left side and a right side of the rear installation panel, respectively.

In some embodiments, the electric circuit board can be fastened or secured to the rear installation panel using a fastener such as a screw, or similar devices known in the art. In some embodiments, the operation panel comprises a display screen connected to the electric circuit board, and a plurality of push buttons operable for push actions.

In some embodiments, the button panel comprises a substantially flat base portion constructed and arranged to form or provide a shape for the substantially flat display panel, and a pair of inclined portions inclinedly extending from a left side and a right side of the base portion, respectively; wherein the inclined portions are constructed and arranged to form or provide a shape for the inclinedly disposed control panel. The base portion comprises a window disposed thereon for accommodating the display screen. The transparent protective board is assembled or secured to the window or a portion thereof so as to protect the display screen. The base portion and the inclined portions comprises a plurality of push portions correspondingly disposed to match with the plurality of push buttons of the electric circuit board, such that the push buttons can be triggered by pressing or pushing the corresponding push portions. The rotary knob is assembled to the base portion and is disposed below the window. In some embodiments, one or more of the push portions are distributed on a left side and a right side of the rotary knob, respectively; one or more of the push portions are distributed on a left side and a right side of the window, respectively; and one or more of the push portions are disposed on the inclined portions.

In some embodiments, the decorative film is configured to have a shape that is substantially similar to that of the button panel, the decorative film comprising a body portion for covering the base portion, and one or more extension portions for covering the one or more inclined portions; wherein the body portion and the extension portions each comprises one or more protrusion portions corresponding to or matching with the push portions, so as to protect the push portions. The body portion comprises a through-aperture for allowing the rotary knob to extend through. The decorative film is constructed using suitable materials and arranged to function as a water resistant and dust resistant layer while being aesthetically pleasing. As such, the at least one control key comprises a push portion disposed on the button panel and a corresponding protrusion portion disposed on the decorative film.

Figure 5:
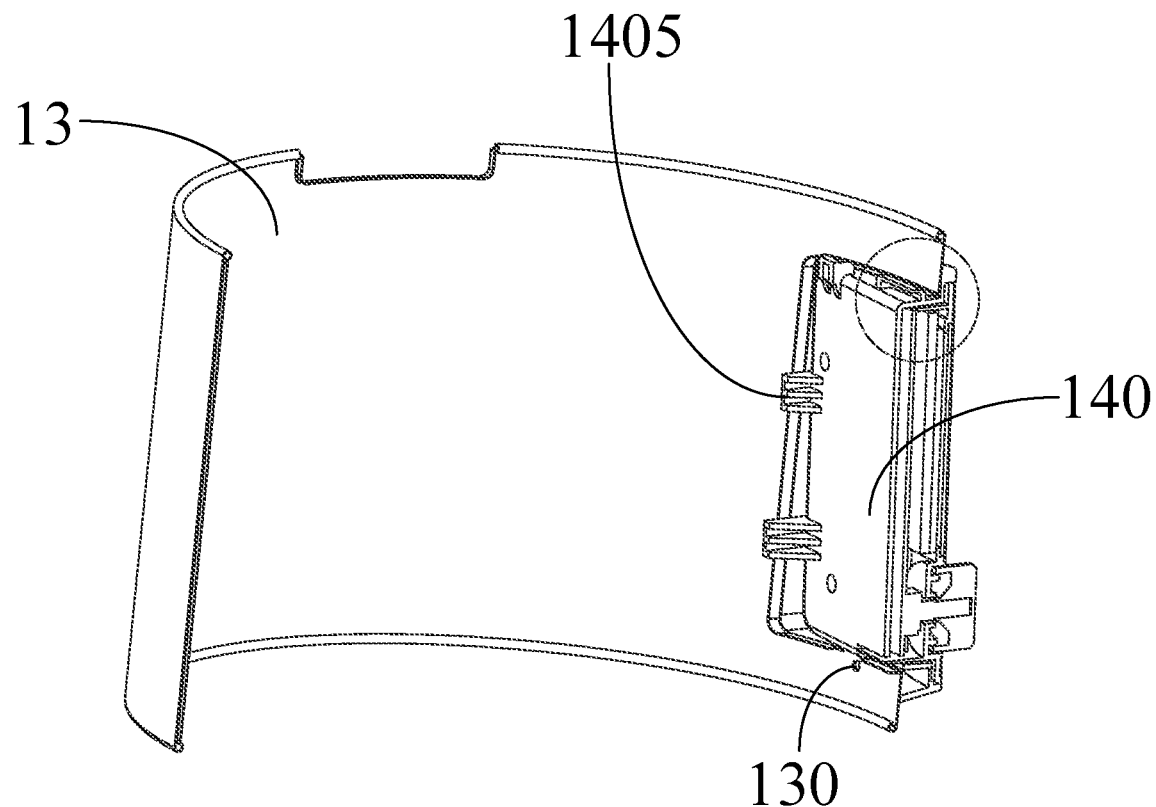
FIG. 5 is a schematic sectional view of the operation panel of FIG. 4 assembled with an outer shell of the electric pressure cooker of FIG. 1.
Figure 6:
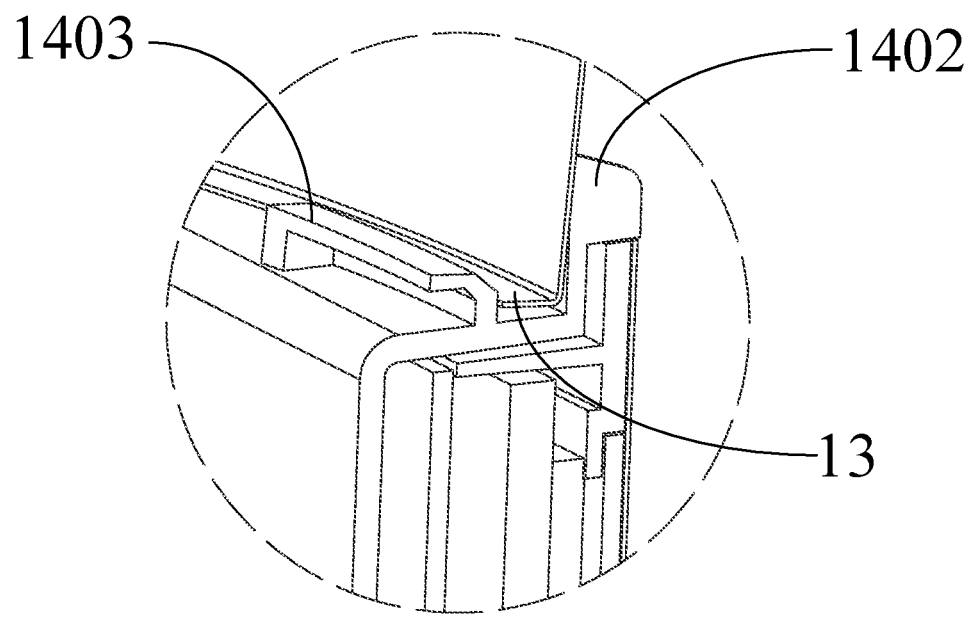
FIG. 6 is a magnified view of the circled area of FIG. 5.
Figure 7:
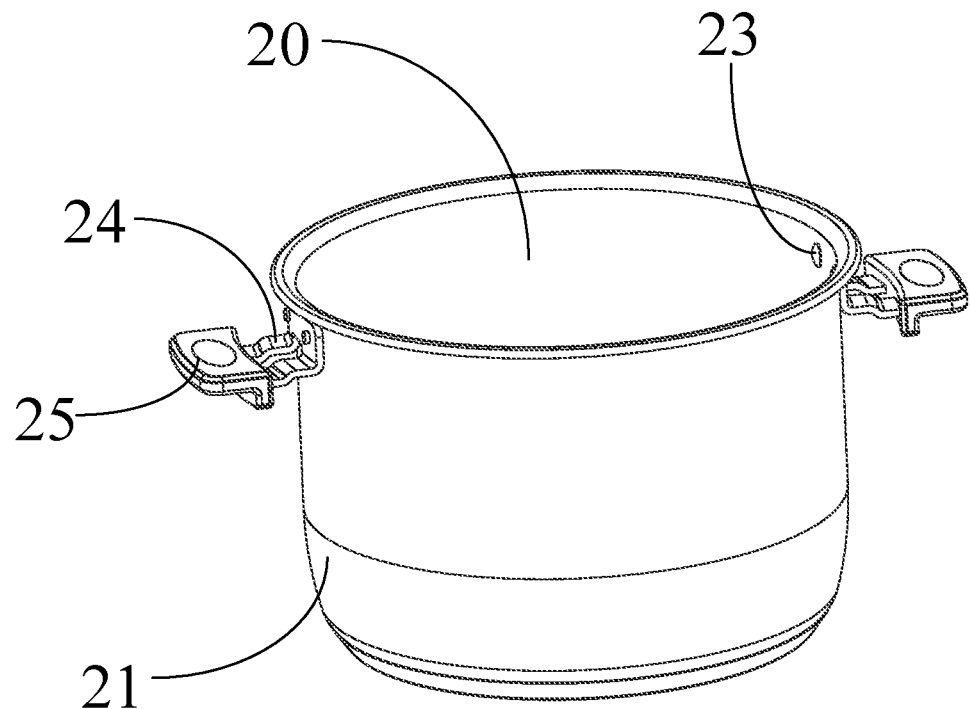
FIG. 7 is a perspective view of an inner pot shown in FIG. 2.

Referring now to FIGS. 5-6, in some embodiments, the outer shell comprises an opening (not numbered) and a flange portion at least partially enclosing the opening of the outer shell. The operation panel is fastened or assembled to the opening (not numbered). In such operation, for example, the operation panel can be brought closer to the opening and pushed upwardly toward the opening in a slant direction relative to the opening, until the flange portion is received between the first position-limiting portion and the second position-limiting portion. Then the operation panel can be pressed or pushed toward the outer shell, so that the positioning protrusions of the operation panel are properly aligned with a periphery or border of the opening, and are pushed into the opening against the periphery or border thereof. Next, a fastener such as a screw or other similar devices (not shown) can be used to secure an engagement between a mounting aperture of the outer shell and the fixing post from an interior side of the outer shell. For example, once the fixing post is aligned with and received within the mounting aperture, the fastener can be inserted into the mounting aperture and screwed into the fixing post so as to securely fasten the operation panel to the outer shell. Advantageously, the tight fitting between the positioning protrusions and the flange portion effectively enhanced the stability of the operation panel.

Referring to FIGS. 1-2 and FIGS. 7-10, in some embodiments, the middle board is disposed to substantially enclose or surround the outer pot or a portion thereof. The outer pot comprises a cavity and a recess portion in communication with the cavity. The inner pot is operable to be removably received within the cavity of the outer pot for food cooking. In some embodiments, the middle board comprises a pair of cooker handles disposed exterior to the cavity and extending outwardly from a sidewall of the cooker body, for lifting or moving the cooker body. The cooker handle comprises a substantially flat handgrip portion and a pair of sidewalls extending upwardly from opposing sides of the handgrip portion, respectively, wherein the handgrip portion and the pair of sidewalls enclose or form a receiving groove.

In some embodiments, the inner pot comprises an inner pot body defining a cooking chamber, and a pair of inner pot handles connected to the inner pot body. The inner pot handle is constructed and arranged to fit within the receiving groove when the inner pot is received within the outer pot, and allows a user to lift the inner pot out of the outer pot. In some embodiments, the handgrip portion extends outwardly from the cooker body to substantially align or overlap with the inner pot handle. In some embodiments, the handgrip portion extends from the cooker body beyond the inner pot handle, so that a user holding the cooker handles will not mistakenly handle or grip the inner pot handles. In some embodiments, the inner pot handle comprises a connecting member fastened to the inner pot body by a rivet or similar devices, and a heat insulation member coupled to the connecting member. In some embodiments, the heat insulation member is assembled or attached to the connecting member, whereas in some other embodiments, the heat insulation member is integrally formed with the connecting member as a unitary piece. In some embodiments, the connecting member is constructed and arranged to extend through the recess portion of the outer pot, and the heat insulation member is disposed outside of the outer pot.

In some embodiments, the inner pot handle is spaced apart from the handgrip portion for a predetermined width in a vertical direction when the inner pot is placed within the outer pot, so as to define a gap between the inner pot handle and the handgrip portion for allowing fingers of a user to be received therein. Advantageously, when a user is reaching for the inner pot handles for lifting or handling the inner pot, his/her fingers will inevitably contact the cooker handles or a part thereof, so as to provide the user the confirmation or assurance that he/she did not mistakenly grip the cooker handles. In some embodiments, the gap has a width that is slightly narrower than an average thickness of an adult finger, for example, the gap width can be about 10 mm to about 13 mm, or within a similarly suitable range, thereby allowing convenient handling of the inner pot while avoid mishandling of the inner pot.

Figure 10:
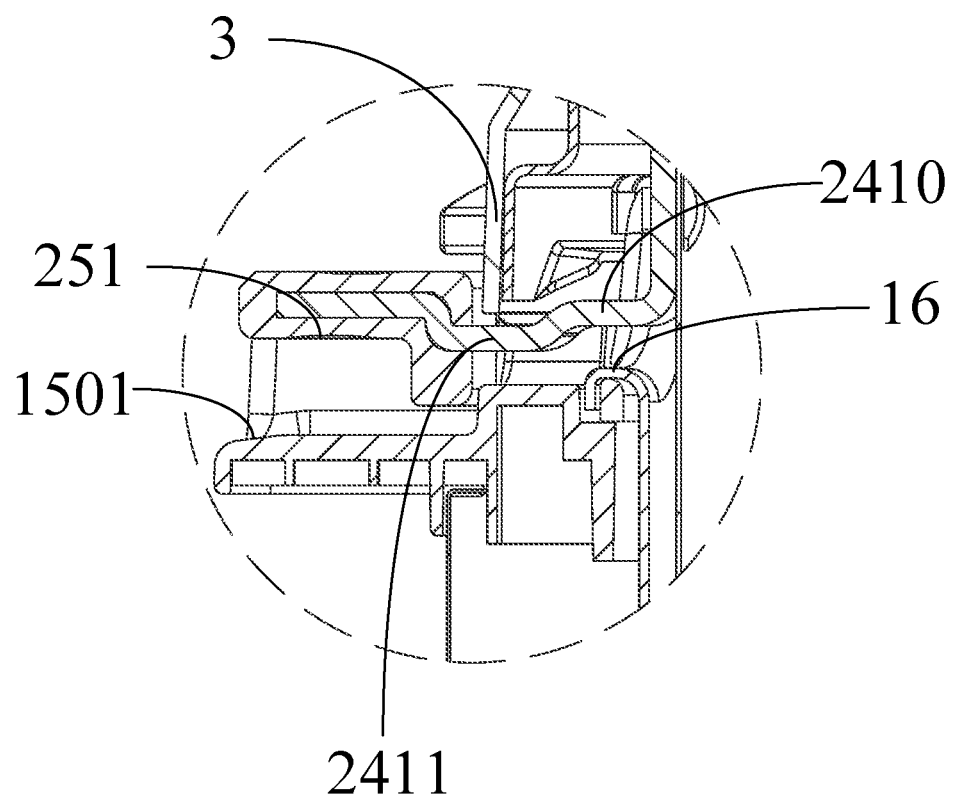
FIG. 10 is a magnified view of the circled area of FIG. 9.

Referring now to FIG. 10, in some embodiments, the handgrip portion comprises a slope portion for ease of handing by hand, wherein a gap between a distal end of the slope portion and the inner pot handles 2 is about 11.5 mm to about 12.5 mm, and wherein a gap between a proximal end of the slope portion and the inner pot handles is about 10.5 mm to about 11.5 mm.

In some embodiments, the heat insulation member is made of plastic rubber materials or other similarly suitable materials so as to provide heat insulation from the connecting member or prevent hand scalds or burns by the connecting member. In some embodiments, the heat insulation member comprises an upwardly concaved recess portion disposed on a bottom wall of the heat insulation member, wherein the recess portion has a tapering shape such that a center portion of the recess portion has a larger depth relative to the bottom wall of the heat insulation member than a peripheral portion of the recess portion. Such tapering shape can be formed to be substantially similar to the shape of a fingertip so as to allow easy access by hand.

Figure 8:
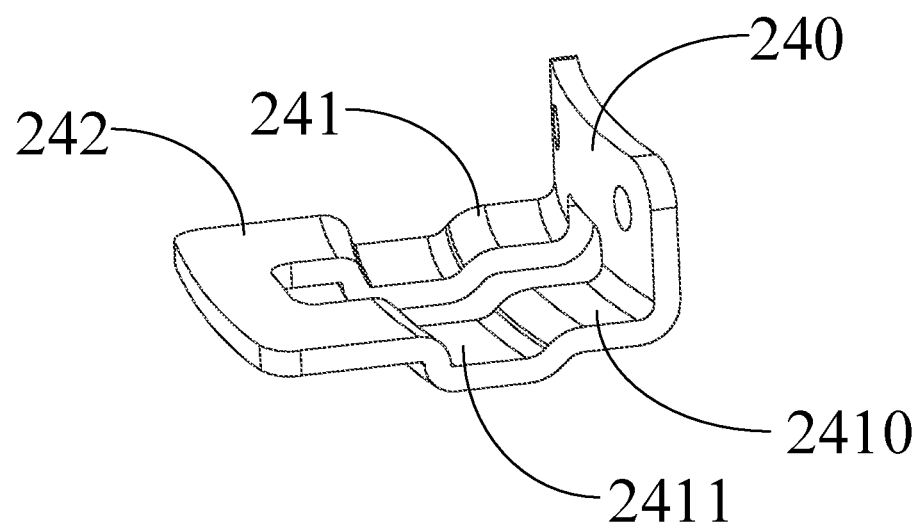
FIG. 8 is a perspective view of a connecting member of the inner pot of FIG. 7.
Figure 9:
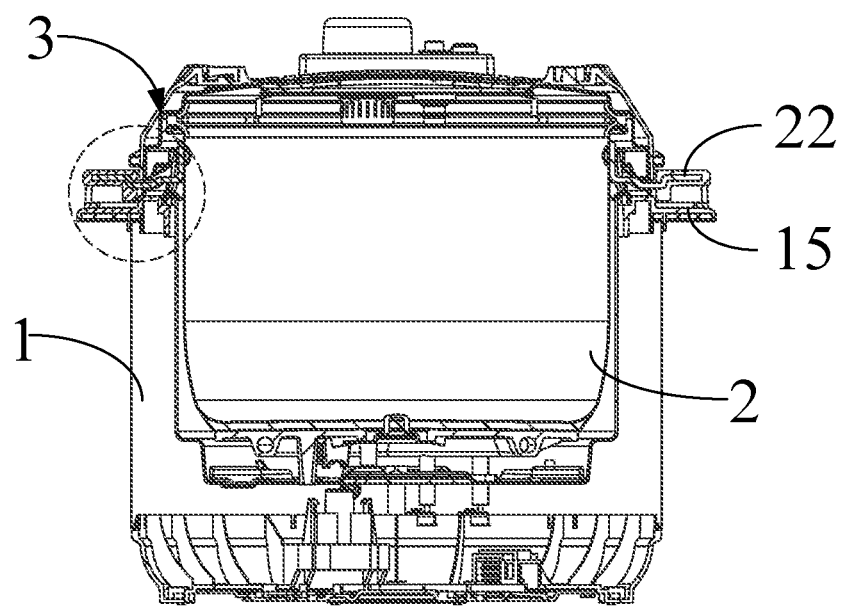
FIG. 9 is a schematic sectional view of an electric pressure cooker in accordance with an example embodiment of the present disclosure.

Referring to FIGS. 8 and 10, in some embodiments, the connecting member is made of metals or metallic materials, and comprises a first attachment portion constructed and arranged to snugly fasten or attach to the inner pot body, a connecting portion substantially laterally or horizontally extending from the first attachment portion, and a second attachment portion extending from the connecting portion. In some embodiments, the first attachment portion is substantially arc-shaped so as to be in better conformity with the inner pot body. In some embodiments, the second attachment portion is generally flat in shape or formed as a panel-like structure for secure attachment to the heat insulation member. In some embodiments, the heat insulation member is integrally formed with the second attachment portion as a unitary piece, whereas in some embodiments, the heat insulation member is assembled or attached to the second attachment portion. In some embodiments, the connecting portion comprises an upper portion disposed in proximity to the inner pot body and a lower portion disposed in proximity to the heat insulation member; wherein the upper portion is constructed and arranged to provide clearance room for the outer pot or accommodate the structure thereof, and the lower portion is constructed and arranged to provide clearance room for the lid assembly or accommodate the structure thereof. In some embodiments, the second attachment portion is constructed and arranged to bendingly extend from the connecting portion in an upward direction and is disposed at raised position relative to the connecting portion or a portion thereof, so that the heat insulation member is disposed at an elevated position, thereby allowing the receiving groove of the cooker handle to be constructed with a relatively shallower depth, when comparing with the embodiments where the second attachment portion is generally flat.

A cooker body of an electric pressure cooker in accordance with example embodiments of the present disclosure comprises a cooker handle disposed thereon, whereas the inner pot comprises an inner pot handle correspondingly disposed above the cooker handle for retrieving the inner pot; wherein the cooker handle comprises a insulation member for preventing hand scalds or burns. The inner pot handle and the handgrip portion of the cooker handle define a gap therebetween, wherein the gap has a width that is slightly narrower than an average thickness of an adult finger, so that when a hand of a user is received in the gap for retrieving the inner pot, the hand will contact the handgrip portion, thereby reminding the user that it is the inner pot that is currently being handled, and thereby preventing mishandling of the inner pot or unintended handling thereof.

The foregoing description is of preferred embodiments of the present application only, and is not intended to limit the present application in any way. Without departing from the technical scope of the present application, a person of ordinary skills in the art may make certain modifications or equivalent substitutions to the disclosed technical contents. Any simple modifications, equivalent changes or equivalent substitutions made to the above embodiments in accordance with the technical principle of the present application are still within the scope of the technical solutions of the present application.

What is claimed is:

1. A pressure cooker comprising:
a cooker body comprising an outer pot;
an inner pot removably receivable within the outer pot; and,
a lid for covering the cooker body;
wherein the outer pot comprises a plurality of cooker teeth, the lid comprises a plurality of lid teeth corresponding with the cooker teeth, and the cooker teeth and the lid teeth are constructed and arranged to lockingly engage with each other upon a rotation of the lid into a closed position relative to the cooker body;
wherein the cooker body comprises a pair of cooker handles extending outwardly from a sidewall of the cooker body, the cooker handles comprising a handgrip portion for lifting or moving the cooker body, and a pair of sidewalls extending upwardly from opposing sides of the handgrip portion, the handgrip portion and the pair of sidewalls forming a receiving groove open at an outer end thereof, opposite the sidewall of the cooker body;
wherein the inner pot comprises an inner pot body and a pair of inner pot handles connected to the inner pot body, the inner pot handles being constructed and arranged to be received between the sidewalls and within the receiving grooves of the cooker handles, and wherein the inner pot handles are spaced apart from the handgrip portion in a vertical direction so as to define a gap between the inner pot handle and the handgrip portion for allowing fingers of a user to be received therein through the open outer end of the receiving groove, opposite the sidewall of the cooker body,
wherein the handgrip portion comprises a slope portion for ease of handling by hand,
wherein the inner pot handle comprises a connecting member fastened to the inner pot body, and a heat insulation member coupled to the connecting member,
wherein the heat insulation member comprises an upwardly concaved recess portion disposed on a bottom wall of the heat insulation member, the recess portion having a tapering shape such that a center portion of the recess portion has a larger depth relative to the bottom wall of the heat insulation member than a peripheral portion of the recess portion, wherein the tapering shape is formed to be substantially similar to a shape of a fingertip, and
wherein the slope portion decreases the gap so as to guide the user's fingers toward the recess portion.

2. The pressure cooker of claim 1, wherein the outer pot comprises:
a cavity for receiving the inner pot therein, and
a pair of recess portions in communication with the cavity, wherein the inner pot handles are constructed and arranged to extend through the recess portions toward the open outer ends of the receiving grooves.

3. The pressure cooker of claim 1, wherein the inner pot handles are accessible by the user via the open outer ends of the receiving grooves when the lid is in the closed position relative to the cooker body.

4. The pressure cooker of claim 1, wherein the handgrip portion extends from the cooker body to at least substantially align with or extend beyond the inner pot handle.

5. The pressure cooker of claim 1, wherein the heat insulation member is assembled to or integrally formed with the connecting member, and disposed outside of the outer pot.

6. The pressure cooker of claim 1, wherein the heat insulation member comprises a downward projecting portion to block the fingers of a user from contacting the connecting member and/or the inner pot body.

7. The pressure cooker of claim 1, wherein:
the cooker body comprises a base, an outer shell mounted to the base, and a cover element covering at least a portion of the outer shell;
the outer pot is mounted to the base, the outer shell, and the cover element; and
the cooker handles are disposed on the cover element.

8. The pressure cooker of claim 1, wherein:
the connecting member comprises a first attachment portion for attaching to the inner pot body, a connecting portion substantially laterally or horizontally extending from the first attachment portion, and a second attachment portion extending from the connecting portion;
the connecting portion comprises an upper portion disposed in proximity to the inner pot body and a lower portion disposed in proximity to the heat insulation member;
the upper portion is constructed and arranged to provide clearance room for the outer pot or accommodate the structure thereof; and
the lower portion is constructed and arranged to provide clearance room for the lid or accommodate the structure thereof.

9. The pressure cooker of claim 1, wherein the vertical gap between the inner pot handle and the handgrip portion has a width of about 10 mm to about 13 mm.

10. The pressure cooker of claim 1, wherein:
the gap between a distal end of the slope portion, opposite the sidewall of the cooker body, and the inner pot handle is about 11.5 mm to about 12.5 mm; and,
the gap between a proximal end of the slope portion, adjacent the sidewall of the cooker body, and the inner pot handle is about 10.5 mm to about 11.5 mm.

11. The pressure cooker of claim 1, wherein:
the handgrip portion is flat in shape; and,
the gap between the inner pot handle and the handgrip portion has a width of about 10 mm to about 13 mm.

12. The pressure cooker of claim 1, wherein:
each of the inner pot handles comprises the connecting member and the heat insulation member coupled to the connecting member, the connecting member comprising a first attachment portion, an upper connection, a lower connection and a second attachment portion connected in turn, the first attachment portion extending substantially vertically and being attached to a side wall of the inner pot body, the upper connection extending substantially horizontally from a lower end of the first attachment portion to provide clearance room for the outer pot, the lower connection being bended from the upper connection to provide clearance room for the lid, the second attachment portion being disposed in a horizontal surface higher than the lower connection and being covered by the heat insulation member.

13. The pressure cooker of claim 12, wherein the connecting member is made of metals or metallic materials.

14. The pressure cooker of claim 1, wherein the bottom wall of the heat insulation member is generally flat around the upwardly concaved recess portion.

* * * * *